(12) United States Patent
Moore (10) Patent No.: US 9,273,740 B2
(45) Date of Patent: Mar. 1, 2016

(54) BRAKE PAD ASSEMBLY WITH RELEASABLE HEAT SINK

(71) Applicant: ASHIMA LTD., Taichung (TW)

(72) Inventor: Wayne-Ian Moore, Changhua County (TW)

(73) Assignee: ASHIMA LTD., Changhua County (TW)

( * ) Notice: Subject to any disclaimer, the term of this patent is extended or adjusted under 35 U.S.C. 154(b) by 87 days.

(21) Appl. No.: 14/042,680

(22) Filed: Sep. 30, 2013

(65) Prior Publication Data

US 2015/0090543 A1 Apr. 2, 2015

(51) Int. Cl.
| | |
|---|---|
| *F16D 65/092* | (2006.01) |
| *B60T 5/00* | (2006.01) |
| *F16D 65/847* | (2006.01) |
| *F16D 69/00* | (2006.01) |
| *F16D 65/78* | (2006.01) |

(52) U.S. Cl.
CPC .............. *F16D 65/092* (2013.01); *B60T 5/00* (2013.01); *F16D 65/847* (2013.01); *F16D 69/00* (2013.01); *F16D 2065/789* (2013.01)

(58) Field of Classification Search
None
See application file for complete search history.

(56) References Cited

U.S. PATENT DOCUMENTS

| | | | | |
|---|---|---|---|---|
| 7,905,335 | B2 * | 3/2011 | Demers ...................... | 188/264 R |
| 8,869,956 | B2 * | 10/2014 | Wen ........................... | 188/264 R |
| 2011/0233013 | A1 * | 9/2011 | Siebke ....................... | 188/264 G |

* cited by examiner

*Primary Examiner* — Sunit Pandya (57) ABSTRACT

A brake pad assembly for mounting on a caliper of a vehicle includes a backing plate, a brake lining disposed on a front side of the backing plate, and a heat sink. The heat sink includes a thermal conductive sheet and a set of cooling fins mounted on a rear side of the thermal conductive sheet. In particular, the thermal conductive sheet is overlapped and releasably fastened on the backing plate.

7 Claims, 8 Drawing Sheets

BRAKE PAD ASSEMBLY WITH RELEASABLE HEAT SINK

BACKGROUND OF THE INVENTION

1. Field of the Invention

The present invention relates to a brake pad assembly and more particularly to a brake pad assembly with a heat sink.

2. Description of the Related Art

Figure 7:
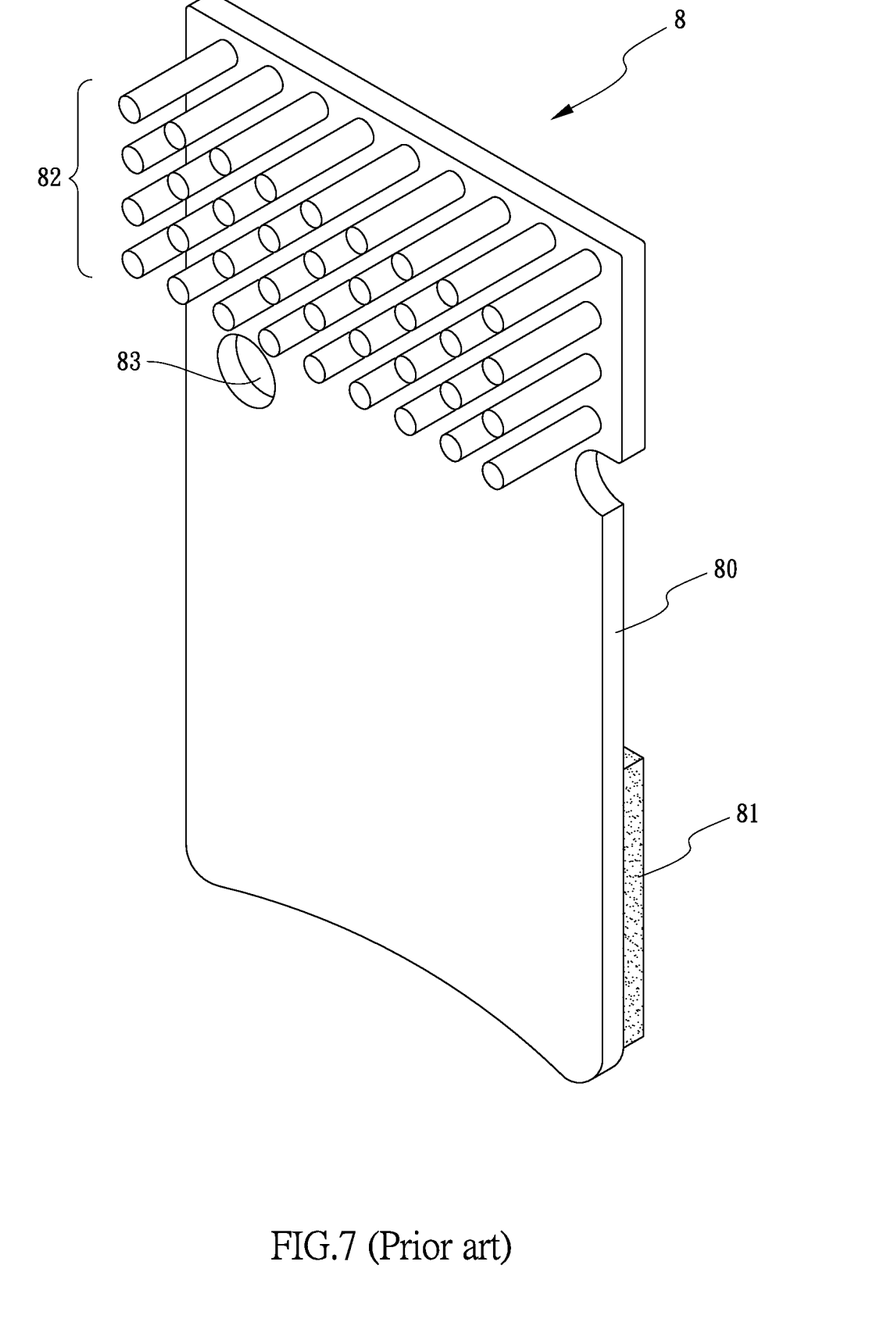
FIG. 7 is a perspective view of a conventional brake pad assembly.
Figure 8:
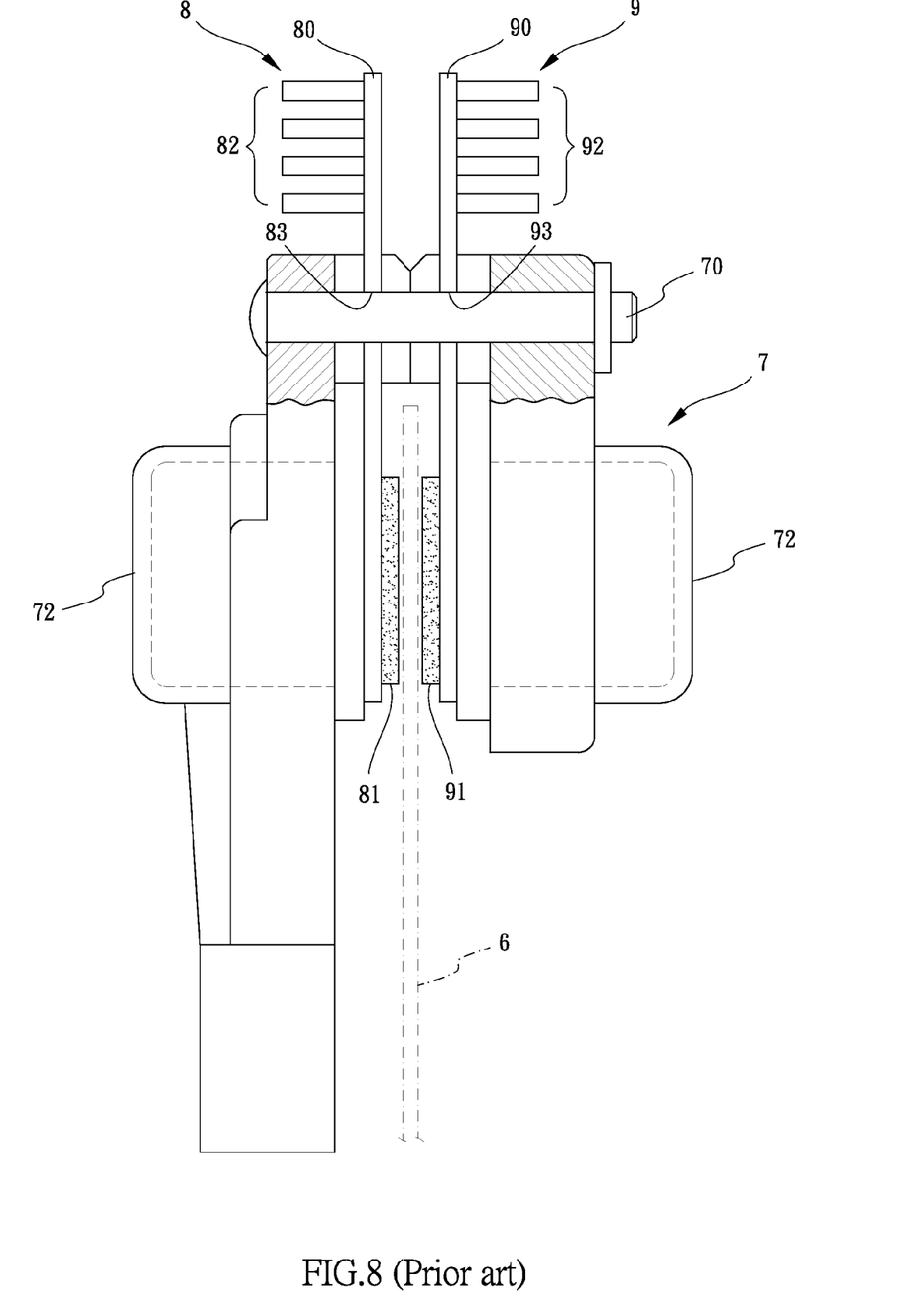
FIG. 8 is a side view, partially in section, of a caliper known in the art in which the brake pad assembly shown in FIG. 7 is mounted.

FIG. 7 illustrates a conventional brake pad assembly 8 which generally includes a backing plate 80, a brake lining 81 disposed on a side of the backing plate 80, and a heat dissipating portion 82 disposed on an opposite side of the backing plate 80. As shown in FIG. 8, the brake pad assembly 8 along with an opposed brake pad assembly 9 is mounted on a caliper 7 of a vehicle with a bolt 70 extending through the positioning holes 83, 93 in the backing plates 80, 90. The caliper 7 includes a pair of pistons (not shown) inside the hydraulic cylinders 71, 72, which force the brake linings 81, 91 along with the backing plates 80, 90 toward one another and into contact with a rotor 6 that spins relative to the caliper 7 when the vehicle is moving. When the brake linings 81, 91 are forced into contact with the spinning rotor 6 during braking, the kinetic energy of the rotor 6 is converted into heat. Substantial amount of heat can be generated in the brake linings 81, 91 and transferred to the heat dissipating portion 82 to be removed, so as to avoid brake fade, a decrease in the stopping power of the brake.

However, since the heat dissipating portion 82 of the brake pad assembly 8 is integrally formed on the backing plate 80, the heat dissipating portion 82, even still in good shape, will have to be abandoned with the brake lining 81 if the brake lining 81 is worn out.

SUMMARY OF THE INVENTION

Accordingly, it is an object of the present invention to provide a brake pad assembly with a releasable heat sink such that when a brake lining of the brake assembly is worn out, the undamaged heat sink can be kept and coupled with a brand new brake lining to be used again.

Specifically, the brake pad assembly is provided for mounting on a caliper of a vehicle, and includes a backing plate, a brake lining disposed on a front side of the backing plate, and a heat sink releasably mounted on the backing plate. The heat sink includes a thermal conductive sheet and a set of cooling fins mounted on a rear side of the thermal conductive sheet. The thermal conductive sheet is overlapped and releasably fastened on the backing plate.

More specifically, the backing plate includes a body on which the brake lining is located, a tongue extending from the body, and a hook portion bending backward from an end of the tongue. The thermal conductive sheet includes a middle section, a first plate section bending from one end of the middle section in a direction, and a second plate section bending from the other end of the middle section in an opposite direction. The middle section of the thermal conductive sheet defines an insertion slot through which the hook portion and the tongue of the backing plate pass. The second plate section of the thermal conductive sheet defines a fastening hole in which the hook portion is inserted. Moreover, the first plate section of the thermal conductive sheet is attached to a front side of the body of the backing plate while the second plate section is attached to a rear side of the tongue of the backing plate. And the hook portion of the backing plate is lodged in the fastening hole with the second plate section hooked at the back by the hook portion.

Further benefits and advantages of the present invention will become apparent after a careful reading of the detailed description with appropriate reference to the accompanying drawings.

DETAILED DESCRIPTION OF EMBODIMENTS

Figure 1:
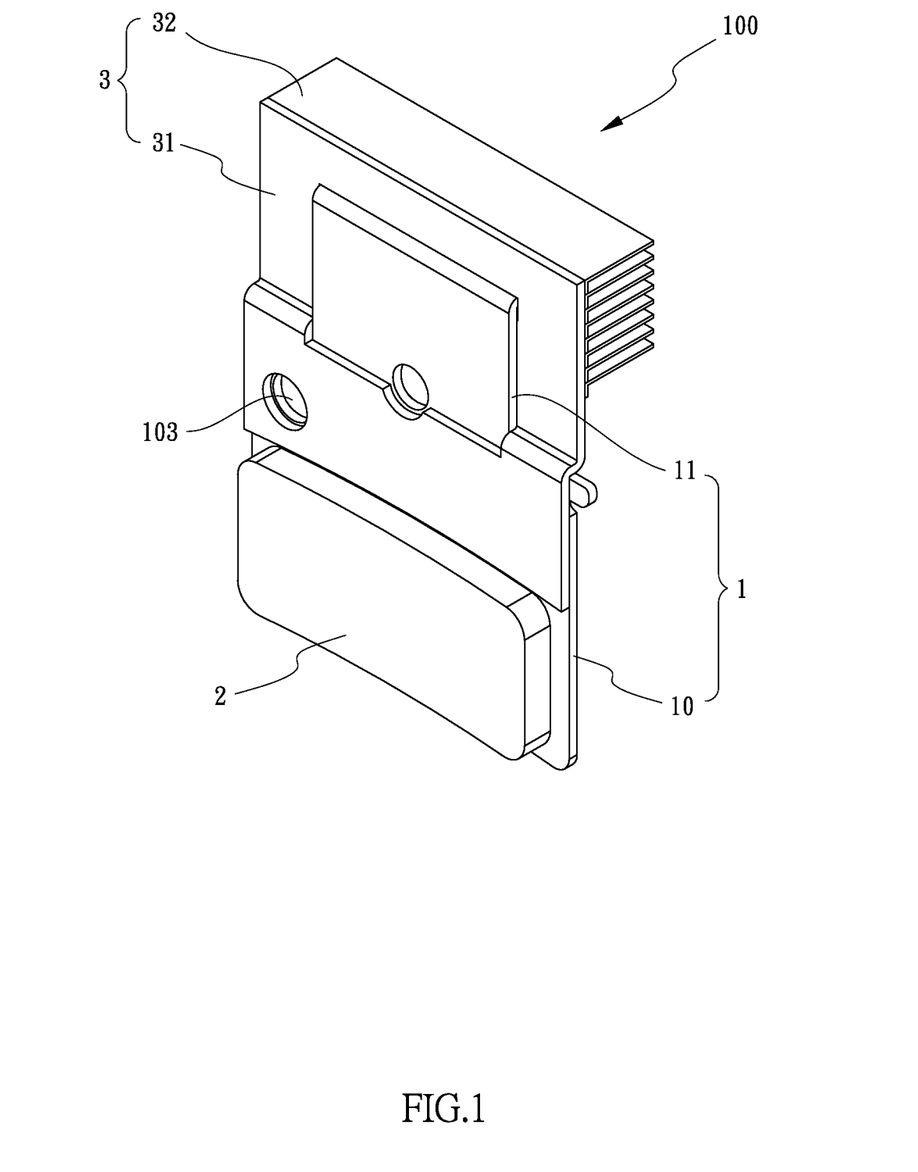
FIG. 1 is a front perspective view of a brake pad assembly in accordance with the preferred embodiment of the present invention.
Figure 2:
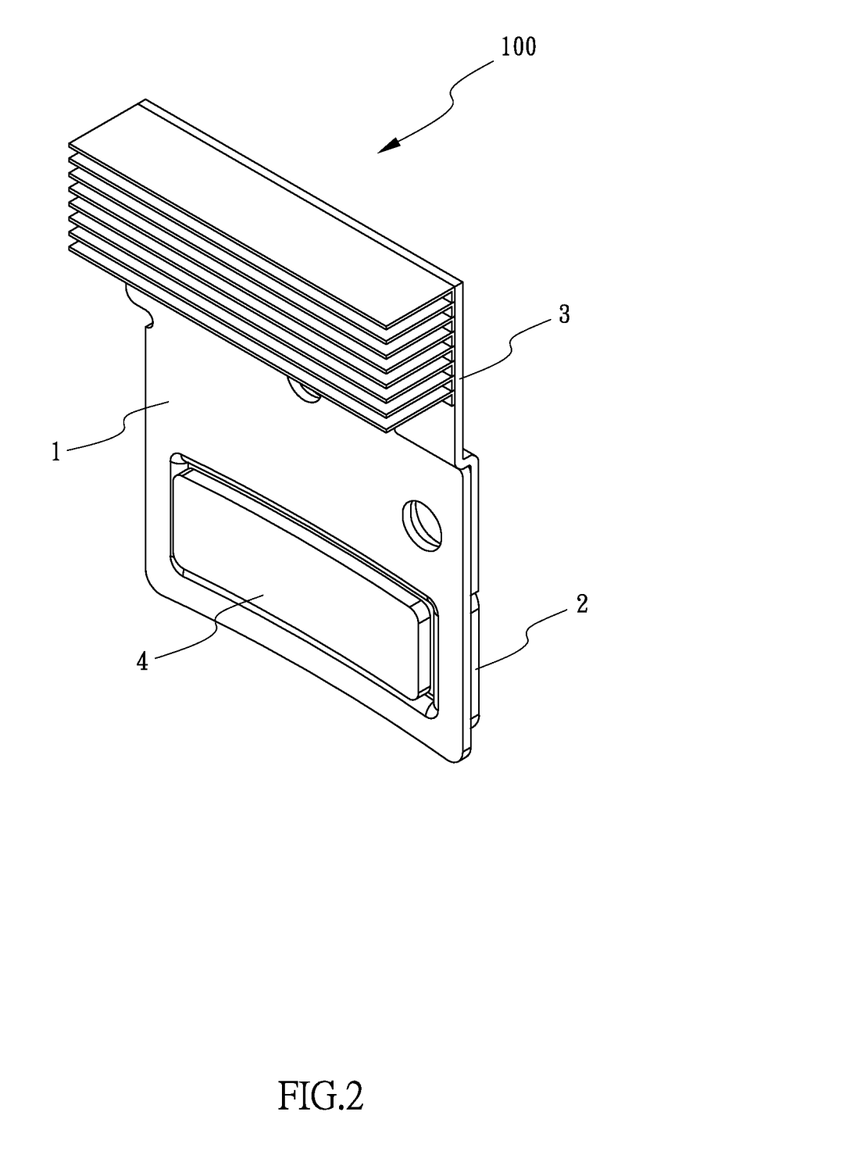
FIG. 2 is a rear perspective view of the brake pad assembly shown in FIG. 1.

Illustrated in the drawings is a brake pad assembly 100 employing the invention. The brake pad assembly 100 is adapted to be mounted on a caliper of a disc brake system of a vehicle. As shown in FIGS. 1 and 2. the brake pad assembly 100 generally includes a backing plate 1, a brake lining 2 disposed on a front side of the backing plate 1, a heat sink 3 connected to the backing plate 1 and a thermal insulation pad 4 mounted on a rear side of the backing plate 1. The heat sink 3 includes a thermal conductive sheet 31 and a set of cooling fins 32 mounted on a rear side of the thermal conductive sheet 31. As such, heat generated by the brake lining 2 during braking can be transferred through the backing plate 1 to the heat sink 3 for heat dissipation. The thermal insulation pad 4 is provided to avoid the heat from, passing through an adjacent hydraulic cylinder of the caliper and from causing damage to the caliper.

Figure 3:
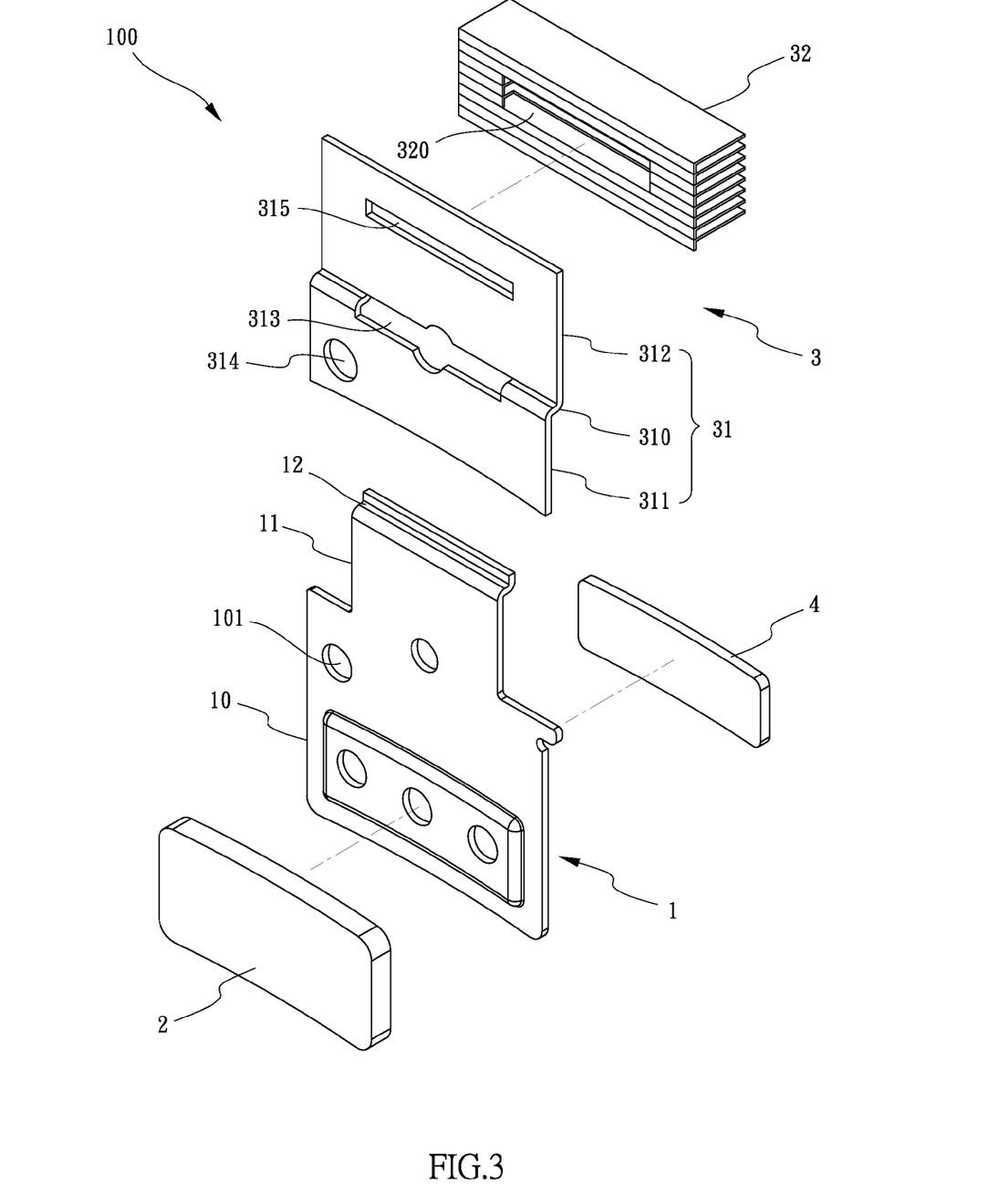
FIG. 3 is an exploded perspective view of the brake pad assembly shown in FIG. 1.
Figure 4:
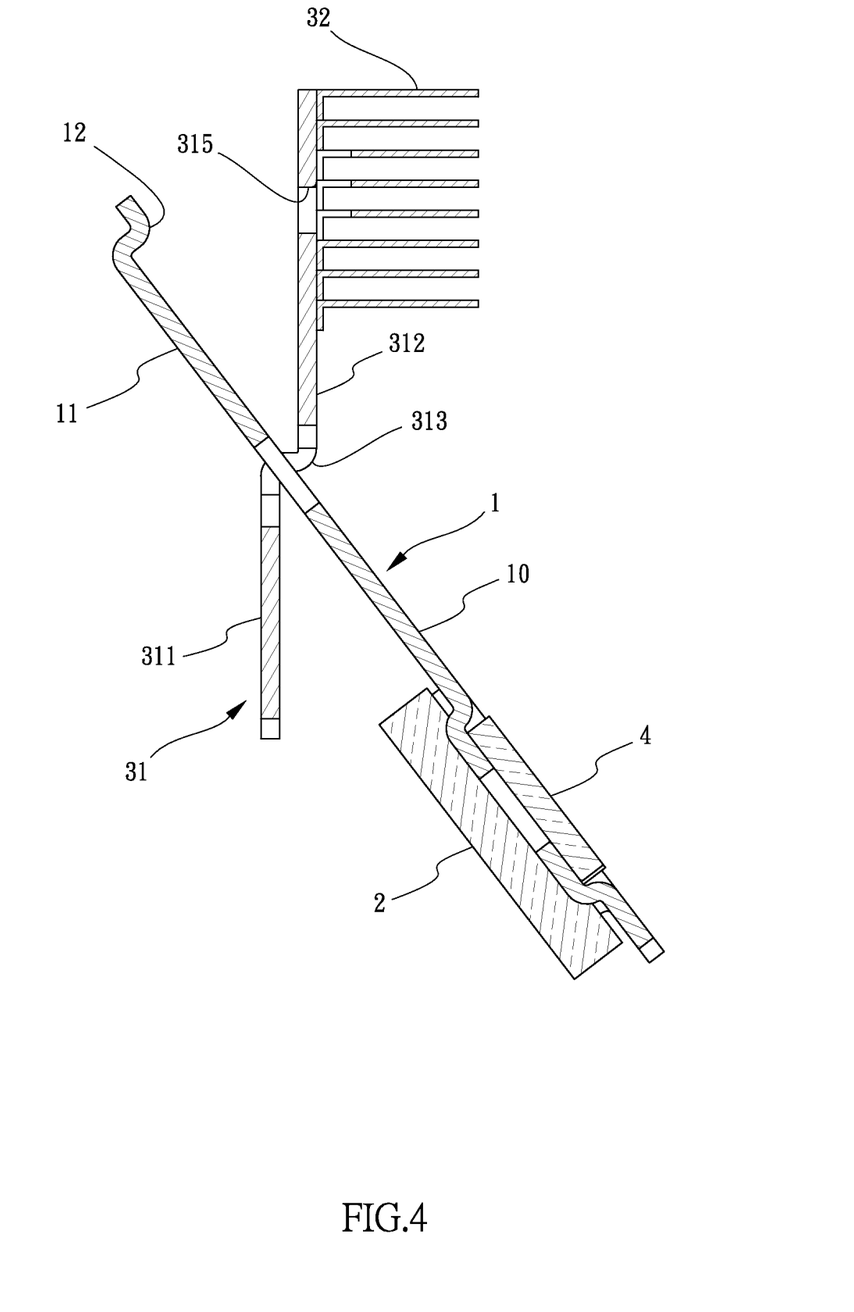
FIGS. 4-6 are cross-sectional views of the brake pad assembly shown in FIG. 1, showing the process of assembling the same.

As shown in FIG. 3, the backing plate 1 includes a body 10 onto which the brake lining 2 and the thermal insulation pad 4 are attached, a smaller tongue 11 extending from the body 10 and having a smaller width, and a buckle 12 bending rearward from an end the tongue 11. The thermally conductive sheet 31 of the heat sink 3 includes a horizontal middle section 310, a first terminal section 311 bending downward from one end of the middle section 310, and a second terminal section 312 bending upward from the other end of the middle section 310. The middle section 310 of the thermally conductive sheet 31 defines a slot 313 through which the buckle 12 and the tongue 11 of the backing plate 1 can pass, as shown in FIG. 4. The second terminal section 312 of the thermally conductive sheet 31 defines a hole 315 in which the buckle 12 is inserted, as shown in FIG. 5 or 6.

Referring back to FIG. 1, the thermally conductive sheet 31 of the heat sink 3 is overlapped and releasable fastened on the backing plate 1. When the thermally conductive sheet 31 and the backing plate 1 are interlocked, as shown in FIG. 6, the first terminal section 311 of the thermally conductive sheet 31 is attached to a front side of the body 10 of the backing plate 1 while the second terminal section 312 is attached to a rear side of the tongue 11 of the backing plate 1. Specifically, the buckle 12 of the backing plate 1 has a first, horizontal section 121 bending from the end of the tongue 11 and a second, vertical section 122 bending upward from the first section 121. The first section 121 of the buckle 12 of the backing plate 1 is received in the hole 315 of the second terminal section 312 of the thermally conductive sheet 31. The second section 122 of the buckle 12 abuts against a rear side of the second terminal section 312. In this manner, the buckle 12 of the backing plate 1 not only is lodged in the hole 315 of the second terminal section 312 of the thermally conductive sheet 31, but also grasps the second terminal section 312 at the back to ensure that the thermally conductive sheet 31 and the backing plate 1 can move together.

Figure 5:
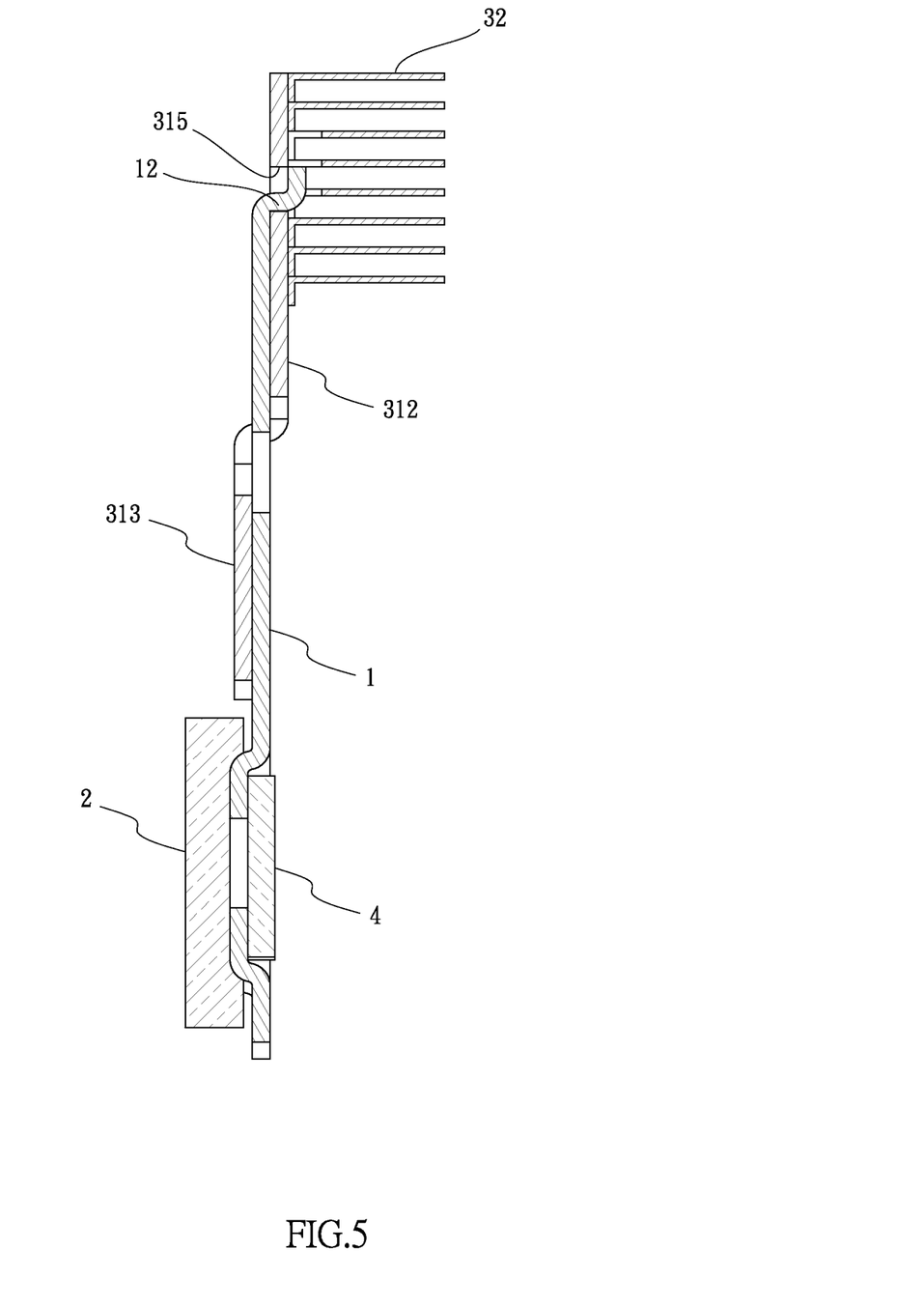
Figure 6:
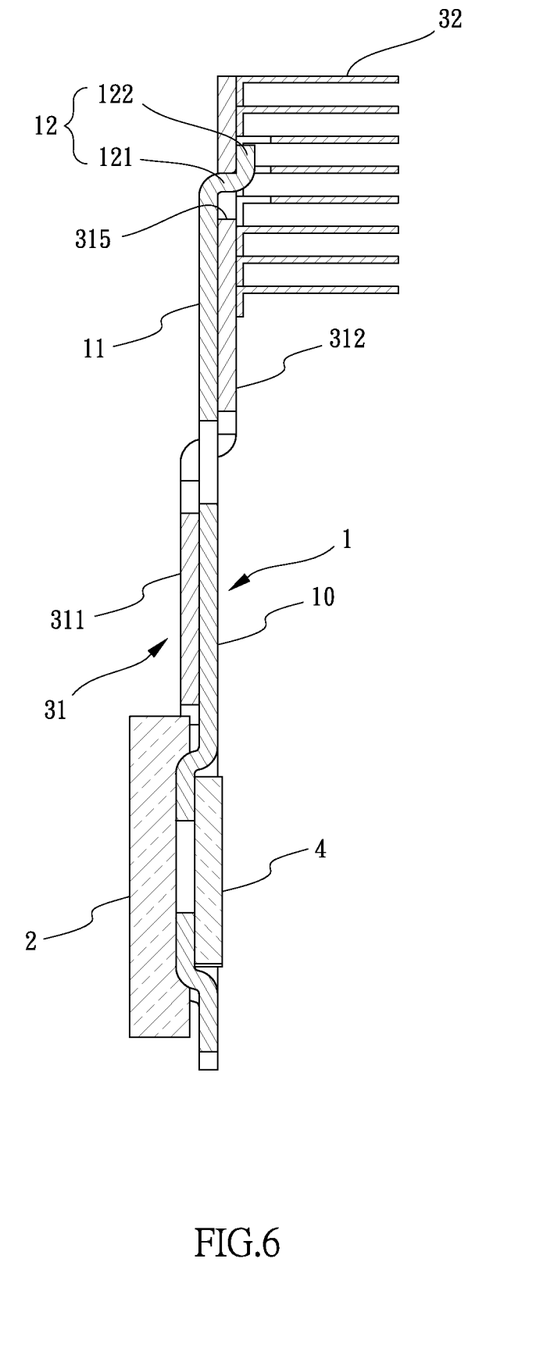

FIGS. 4-6 illustrate a process for assembling the brake pad assembly 100. Firstly, the buckle 12 and the tongue 11 of the backing plate 1 together are inserted into the slot 313 of the thermally conductive sheet 31 at an angle, as depicted in FIG. 4. Next, the backing plate 1 and the thermally conductive sheet 31 are drawn close to each other in a line, as depicted in FIG. 5, with the buckle 12 of the backing plate 1 inserted in the hole 315 of the second terminal section 312 of the thermally conductive sheet 31. Finally, the backing plate 1 is moved upward with respect to the thermally conductive sheet 31 to have the second terminal section 312 hooked at the back by the buckle 12 of the backing plate 1, as depicted in FIG. 6.

Preferably, the set of the cooling fins 32 of the heat sink 3 defines a receiving room 320, as best seen in FIG. 3, to receive the buckle 12 of the backing plate 1 which protrudes outside the second terminal section 312. Moreover, the set of the cooling fins 32 may be bonded to the rear side of the thermally conductive sheet 31 by welding. Alternately, the set of cooling fins 32 may be manufactured separately and simply be assembled onto the thermally conductive sheet 31.

Referring to FIG. 3, the body 10 of the backing plate 1 defines a through hole 101 and the first terminal section 311 of the thermally conductive sheet 31 also defines a through hole 314. It is when the second terminal section 312 of the thermally conductive sheet 31 is hooked by the buckle 12 of the backing plate 1 that the though hole 101 in the body 10 of the backing plate 1 is exactly aligned with the through hole 314 in the first terminal section 311 of the thermally conductive sheet 31 so as to form a positioning hole 103, as shown in FIG. 1. At this time, a bolt may be inserted into the positioning hole 103 to have the brake pad assembly 100 be assembled onto the caliper.

As described above, it is understood that the heat sink 3 can be mounted fast onto the backing plate 1 for heat dissipation of the brake pad assembly 100, and while the brake lining 2 is worn out and needs to be replaced, the undamaged heat sink 3 can be kept and reused by coupling with a new brake lining.

It is to be understood that the disclosed embodiments are illustrative in nature and the invention is not to be limited to any one or more embodiments except as set forth in the following claims.

What is claimed is:

1. A brake pad assembly for mounting on a caliper of a vehicle, the brake pad assembly comprising:
    a heat sink including:
        a thermally conductive sheet including:
            a middle section including a slot;
            a first terminal section extending from one end of the middle section and including a front side and a rear side; and
            a second terminal section extending from the other end of the middle section and including a front side, a rear side and a hole;
        a set of fins attached to the rear side of the second terminal section;
    a backing plate including:
        a body including a front side in contact with the rear side of the first terminal section;
        a tongue extending from the body, extending through the slot, and including a front side and a rear side in contact with the front side of the second terminal section; and
        a buckle extending from an end of the tongue on the front side of the second terminal section to the rear side of the second terminal section via the hole so that the backing plate is connected to the thermally conductive plate in a releasable manner; and
    a brake lining attached to the front side of the body of the backing plate.

2. The brake pad assembly of claim 1, wherein the set of cooling fins of the heat sink defines a receiving room to receive the buckle of the backing plate.

3. The brake pad assembly of claim 2, wherein the buckle of the backing plate has a first section bending from the end of the tongue and a second section bending from the first section;
    wherein the first section of the buckle of the backing plate is received in the hole of the second terminal section; and
    wherein the second section of the buckle abuts against the rear side of the second terminal section.

4. The brake pad assembly of claim 3, wherein the body of the backing plate defines a through hole and the first terminal section; and
    when the second terminal section is hooked by the buckle of the backing plate, the though hole in the body of the backing plate and the through hole in the first terminal section are aligned with one another to form a positioning hole for receiving a bolt in order to have the brake pad assembly be assembled onto the caliper.

5. The brake pad assembly of claim 1, further comprising a thermal insulation pad mounted on the rear side of the body of the backing plate.

6. The brake pad assembly of claim 1, wherein the set of cooling fins is bonded to the rear side of the second terminal section by welding.

7. The brake pad assembly of claim 1, wherein the rear side of the first terminal section extends in a same plane with the front side of the second terminal section.

\* \* \* \* \*